US 8,576,816 B2

(12) United States Patent
Lamy-Bergot et al.

(10) Patent No.: US 8,576,816 B2
(45) Date of Patent: Nov. 5, 2013

(54) METHOD AND DEVICE FOR THE RELIABLE TRANSMISSION OF COMPRESSED NETWORK HEADERS

(75) Inventors: Catherine Lamy-Bergot, Paris (FR); Pierre Hammes, Courbevoie (FR)

(73) Assignee: Thales, Neuilly sur Seine (FR)

( * ) Notice: Subject to any disclaimer, the term of this patent is extended or adjusted under 35 U.S.C. 154(b) by 607 days.

(21) Appl. No.: 12/746,561

(22) PCT Filed: Dec. 4, 2008

(86) PCT No.: PCT/EP2008/066836
§ 371 (c)(1),
(2), (4) Date: Oct. 27, 2010

(87) PCT Pub. No.: WO2009/071644
PCT Pub. Date: Jun. 11, 2009

(65) Prior Publication Data
US 2011/0032917 A1    Feb. 10, 2011

(30) Foreign Application Priority Data

Dec. 7, 2007    (FR) ...................................... 07 08544

(51) Int. Cl.
| H04W 4/00 | (2009.01) |
| G06F 15/173 | (2006.01) |
| G06F 11/00 | (2006.01) |
| H04M 3/42 | (2006.01) |

(52) U.S. Cl.
USPC ........... 370/338; 370/347; 370/348; 370/349; 370/389; 370/392; 709/238; 709/246; 709/247; 714/758; 714/776; 714/779; 714/708; 455/414.1

(58) Field of Classification Search
USPC ............ 370/328–463; 709/246–238; 714/708
See application file for complete search history.

(56) References Cited

U.S. PATENT DOCUMENTS 5,410,754 A * 4/1995 Klotzbach et al. ............. 370/466
5,717,689 A * 2/1998 Ayanoglu ...................... 370/349

(Continued)

FOREIGN PATENT DOCUMENTS

| EP | 1533930 A | 5/2005 |
| EP | 1710942 A1 | 10/2006 |
| WO | 00/69139 A2 | 11/2000 |

OTHER PUBLICATIONS

International Search Report from PCT/EP2008/066836 issued Apr. 1, 2009.

(Continued)

*Primary Examiner* — Ayaz Sheikh
*Assistant Examiner* — Venkatesh Haliyur
(74) *Attorney, Agent, or Firm* — Stroock & Stroock & Lavan, LLP

(57) ABSTRACT

Method for transmitting data in a transmission system, the data being transmitted in the form of packets including a compressed header field and a data field and according to a format suited to the transmission system comprising the following steps: recovering the data packet to be transmitted including a compressed header and useful data, identifying the header part from the useful-data part, applying a corrector coding which is selected at the level of the header, and providing the resulting new packet to the link layer, while also communicating the protection mode used, generating the link header according to the transmission format of the relevant transmission system integrating the mode of protection used, and the adaptation of the CRC checksum of the link layer, on reception, performing the error corrector decoding in two steps.

12 Claims, 2 Drawing Sheets

(56) References Cited

U.S. PATENT DOCUMENTS

| | | | |
|---|---|---|---|
| 6,477,669 B1* | 11/2002 | Agarwal et al. | 714/708 |
| 6,791,944 B1* | 9/2004 | Demetrescu et al. | 370/235 |
| 6,819,658 B1* | 11/2004 | Agarwal et al. | 370/316 |
| 6,882,637 B1 | 4/2005 | Le et al. | |
| 7,069,495 B2* | 6/2006 | Soderberg et al. | 714/776 |
| 7,415,041 B2* | 8/2008 | Harris | 370/469 |
| 7,430,617 B2* | 9/2008 | Walsh et al. | 709/247 |
| 7,443,814 B2* | 10/2008 | Agarwal et al. | 370/316 |
| 7,558,882 B2* | 7/2009 | Walsh et al. | 709/247 |
| 7,738,391 B2* | 6/2010 | Melpignano et al. | 370/252 |
| 8,233,462 B2* | 7/2012 | Walton et al. | 370/338 |
| 2002/0071432 A1* | 6/2002 | Soderberg et al. | 370/389 |
| 2005/0135284 A1* | 6/2005 | Nanda et al. | 370/294 |
| 2005/0135295 A1* | 6/2005 | Walton et al. | 370/328 |
| 2005/0135318 A1* | 6/2005 | Walton et al. | 370/338 |
| 2005/0160184 A1* | 7/2005 | Walsh et al. | 709/247 |
| 2005/0265383 A1* | 12/2005 | Melpignano et al. | 370/465 |
| 2006/0146757 A1* | 7/2006 | Harris | 370/335 |
| 2006/0198393 A1* | 9/2006 | Lamy et al. | 370/469 |
| 2008/0279532 A1* | 11/2008 | Shimazaki et al. | 386/94 |
| 2008/0320171 A1* | 12/2008 | Walsh et al. | 709/247 |
| 2011/0032917 A1* | 2/2011 | Lamy-Bergot et al. | 370/338 |
| 2012/0263137 A1* | 10/2012 | Walton et al. | 370/329 |

OTHER PUBLICATIONS

Written Opinion from PCT/EP2008/066836 issued Apr. 1, 2009.
International Preliminary Report on Patentability from PCT/EP2008/066836 issued May 7, 2010.

* cited by examiner

METHOD AND DEVICE FOR THE RELIABLE TRANSMISSION OF COMPRESSED NETWORK HEADERS

CROSS REFERENCE TO RELATED APPLICATIONS

This application is the U.S. National Phase application under 35 U.S.C. §371 of International Application No. PCT/EP2008/066836, filed Dec. 4, 2008, and claims the benefit of French Patent Application No. 0708544, filed Dec. 7, 2007, all of which are incorporated by reference herein. The International Application was published on Jun. 11, 2009 as WO 2009/071644.

FIELD OF THE INVENTION

The invention relates to a method and a device making it possible to protect data against errors, in a transmission system.

It is used notably in the transmission of multimedia data. It also applies in the transmission of data by packets having a compressed header.

BACKGROUND

In the field of data transmissions, the data may be marred by errors due to the transmission channel itself. Transmission in wireless channels, such as for example the use of UMTS (Universal Mobile Telecommunication System), WiFi technology, or else WiMAX, or the solutions employed on High Frequency (HF) channels etc. gives rise to errors which may disturb the decoding of the data on reception.

To combat the risk that these errors may disturb transmission, it is known to a person skilled in the art to use solutions of data retransmission type, for example, the technique of automatic retransmission of data better known by the abbreviation ARQ (Automatic Request), or its offshoot hybrid-ARQ. These solutions are in general applied at the network level.

There also exist solutions relying on the introduction of redundancy (FEC: Forward Error Correction) at the radio access level, that is to say at the level of the physical layer of the transmission system directly.

It is also known to employ standard compressed headers with a more significant error corrector coding at the level of the physical layer or the use of retransmissions.

The main drawback of the solutions present in the state of the art is that, in general, the protection is afforded at the level of the header plus data as a whole, without differentiation and with deletion of the packet in the case of corruption, whereas one might possibly wish to receive partially corrupted payloads if in fact their header remains correct.

An additional drawback to retransmission techniques is that they assume the presence of a duplex link, this not always being possible, notably in the case of broadcasting applications.

Another drawback of the prior art techniques is that they give rise to a high level of redundancy at the physical level, under the network layer. This can cause on the one hand, an incompatibility with the standard used (if no provision has been made for such a protection level, or the use of the codes that one wishes to use) and on the other hand, generally leads to an increase in the protection level on the packet as a whole in an undifferentiated manner, thus turning out to be more expensive in terms of bandwidth.

The idea of the invention relies on a new approach which consists notably in protecting the header of the packet to be transmitted without this involving also protecting the useful data in the event that the data transmission is operating normally.

SUMMARY OF THE INVENTION

The subject relates to a method for transmitting data in a transmission system, the data being transmitted in the form of packets comprising at least one header field and one data field and according to a format suited to the transmission system characterized in that it comprises at least the following steps:
- recovering the data packet to be transmitted which comprises a header and useful data, identifying the header part from the useful-data part,
- applying a corrector coding which is selected at the level of the header, and providing the resulting new packet to the link layer, while also communicating the protection mode used,
- generating the link header according to the transmission format of the relevant transmission system integrating the mode of protection used, and the adaptation of the CRC checksum of the link layer,
- on reception, performing the error corrector decoding in two steps:
  A first step of decoding on the start of the RCH compressed header, making it possible to deduce the information regarding the size of the initial compressed header,
  A second step of decoding the remainder of the header on the basis of the previously determined size information.

BRIEF DESCRIPTION OF DRAWINGS

Other characteristics and advantages will become apparent on reading the detailed description given by way of nonlimiting example which follows in relation to appended drawings which represent.

DETAILED DESCRIPTION

In order to better elucidate the method according to the invention, the description which follows is given within the framework of an application for protecting IP headers, in particular when they have been compressed, for example by means of the ROHC (Robust Header Compression) standard standardized by the IETF committee in RFC 3095 and related RFCs.

The idea consists notably in applying a protection mechanism to a relevant compressed header by applying an error corrector code, so as to protect the packet header. Indeed, the loss of the header generally gives rise to the loss of the packet. Now, in the given example, the reception of the source data (that is to say the data useful at the application level) even partially corrupted at the transport or application level is preferable to a loss of the corresponding packets. This typically involves transmissions for which it has been possible to implement mechanisms for protection, correction or masking at the application or transport level, such as for example, audio or video transmissions: in this case, the elimination of a packet from the protocol stack (for example at the link or network level) on account of the corruption of its header is deleterious.

Figure 1:
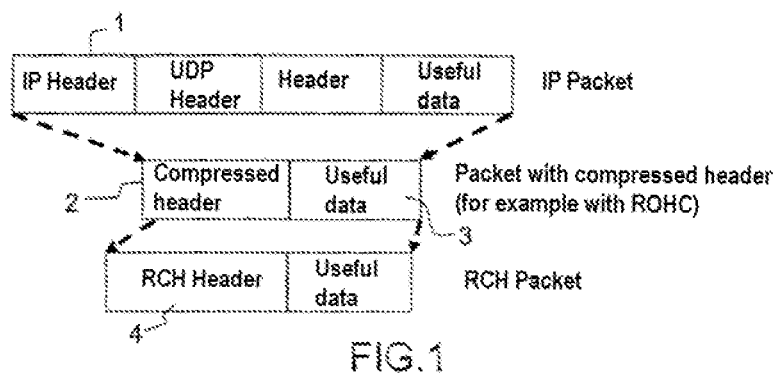
FIG. 1, the RCH (robust compressed header) packet protection.

FIG. 1 shows diagrammatically the steps allowing a change of the content or format of the data packet to be transmitted by applying the methods according to the invention.

The method implements for example the following steps:

Step 1: recover the network packet from the IP layer, 1, and identify the compressed header part, 2, from the source data part; from a network point of view, the payload=the data to be transmitted from the point of view of the relevant layer, therefore notably the source data, but also the headers of the layers above.

Step 2: apply a selected corrector coding, whether involving a default code or a code selected as a function of the information available about the state of the relevant transmission link, and provide the resulting new network packet 4 to the link layer, with identification of the RCH (robust compressed header) error coding information: mode of protection used, and if appropriate the length of the protected compressed header.

Step 3: generate the link header according to the relevant transmission standard integrating the RCH information (mode of protection used, and if appropriate the length of the protected compressed header), and adaptation of the checksum (CRC) of the link layer.

The RCH (robust compressed header) mechanism applies naturally also in the case where the header is not in fact compressed, this being for example the case when employing the uncompressed mode "UNCOMPRESSED" of the ROHC protocol, knowing that it then turns out to be more expensive to put into practice since the part of the data packet to be protected is more consequent.

The RCH mechanism can be integrated directly into the application of the conventional header compression mechanism, thereby simplifying the transmission of the identification of the compressed header part from the useful-data part to the RCH module in the first step.

The RCH mechanism can also be extended to the protection of all or part of the useful data, by adapting the error corrector coding mechanism so as to make it pertain to all or part of the useful data, and this will involve the need to also add the corresponding RCH information to the link header. In practice, this will be beneficial only if the headers are better protected than the useful-data part.

The data to be transmitted are for example of multimedia type.

Figure 2:
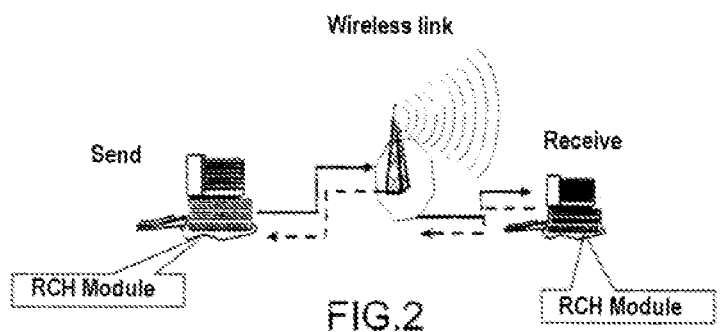
FIG. 2, an exemplary communication chain implementing RCH modules according to the invention, FIGS. 3 and 4, curves of gain in terms of throughput used and of final yield at the application level.

FIG. 2 shows an exemplary communication chain implementing RCH modules, which in practice are positioned under the network layer (IP) in the place of (or inside) the conventional header compression modules of ROHC type. On the sender 1 side, the RCH data are either known, or introduced by an RCH module 2 according to modes described hereinafter. On the receiver 3 side, either the receiver knows the parameters used for the correction of errors, if any, or it comprises an RCH module 4 suitable for finding these parameters (mode of protection used, and if appropriate length of the protected compressed header). The data are transmitted through a wireless link 5.

The implementation of the RCH, which relies on the three steps set forth previously, is illustrated hereinafter in the case of the application to a radio access of type 802.11.

In practice, the 802.11 standard [1] defines the format of the frames exchanged as follows:

CHART 1

| FC (2) | D/ID (2) | Address 1 (6 bytes) | Address 2 (6 bytes) | Address 3 (6 bytes) | SC (2) | Address 4 (6 bytes) |
|---|---|---|---|---|---|---|
| Body of the frame (0 to 2312 bytes) FCS(4) | | | | | | |

With: FC: frame control
D/ID: Duration/Identifier (ID)
SC: sequence control
FCS: integrity checksum also named CRC (frame check sequence) where each frame has a header (termed MAC header for medium access header), a frame body (of variable length, conveying the headers of the higher protocol layers and the useful data of the packet), and a check field (termed FCS for Frame Sequence Check) allowing error detection.

More precisely, the header splits up notably according to the following fields:

Frame control field (termed FC for Frame Control), on two bytes, which breaks down as follows:

CHART 2

| Protocol version (2 bits) | | Type (2 bits) | | Sub-Type (4 bits) | | |
|---|---|---|---|---|---|---|
| of DS (1 bit) | toward DS (1 bit) | More Frag (1 bit) | Retry (1 bit) | Power Mgt (1 bit) | More data (1 bit) | WEP (1 bit) | order (1 bit) |

With: DS: distribution service
Frag: fragments
Retry: retransmission
WEP: mode of encipherment WEP (Wired Equivalent Privacy)

wherein are indicated in particular the "type" and the "sub-type" of the frame considered, the fields which make it possible to separate the management type (corresponding to the association requests and to the access point announcement messages), control type (which identifies the requests for authorization of access to the medium so as to send traffic) and data type (which corresponds to the data frames). The sub-type makes it possible to distinguish from among the various types the exact nature of the frame considered:

body of the frame, which contains the payload for the link layer, that is to say the complete IP packet (header, compressed or not and source data), checksum field (also called CRC for Cyclic Redundancy Check) which makes it possible to detect errors by checking the integrity of the data block to which it pertains.

The RCH solution according to the invention corresponds to introducing error corrector coding on the compressed IP header, but also to letting through packets whose useful data may be corrupted. Therefore it is necessary to reduce the scope of the checksum field and to make it pertain only to the header, and no longer to the header and the body of the frame as is conventionally done.

An exemplary definition of new sub-types, from among the reserved values, for identifying the RCH streams (and optionally the ROHC stream) is given in the following chart 3:

CHART 3

| Type value | Description | Sub-type value | Sub-type description |
|---|---|---|---|
| 10 | data | 0000 | Data |
| 10 | data | 0001 | Data + CF-Ack |
| 10 | data | 0010 | Data + CF-Poll |
| 10 | data | 0011 | Data + CF-Ack + CF-Poll |
| 10 | data | 0100 | Null |
| 10 | data | 0110 | CF-Poll (no data) |
| 10 | data | 0111 | CF-Ack + CF-Poll (no data) |
| _10_ | data | _1000_ | Data ROHC |
| _10_ | data | _1001_ | Data RCH mode 1 |
| _10_ | data | _1010_ | Data RCH mode 2 |
| _10_ | data | _1011_ | Data RCH mode 3 |
| 10 | data | 1100-1111 | reserved |
| 11 | data | 0000-1111 | reserved | code index considered will thus be given on two to eight bits referring to a predefined table known to the sender and to the receiver and containing the information necessary for the error corrector coding and decoding operations (type of code, generating polynomial(s), rate, etc). The information regarding the size of the compressed initial header l will be coded on six to eight bits, the value transmitted in practice being either the size itself or being inferred from the size by a simple rule: thus, in the case of an RTP/UDP(-Lite)/IPv6 header compression, the size of the ROHC compressed header can attain a length l=65 bytes, thereby making it possible to code l−1 on just 6 bits. The resulting new field FC is illustrated below. In this case, the scope of the checksum field is here again modified, on the new header only (of size 31 or 32 bytes in this case for the example considered).

CHART 4

| Protocol version (2 bits) | | | Type (2 bits) | | | Sub-Type (4 bits) | |
|---|---|---|---|---|---|---|---|
| To DS (1 bit) | From DS (1 bit) | More Frag (1 bit) | Retry (1 bit) | Power Mgt (1 bit) | More Data (1 bit) | WEP (1 bit) | Order (1 bit) |
| Code considered (2 bits) | | | | Length of the header (6 bits) | | | |
| Protocol version (2 bits) | | | Type (2 bits) | | | Sub-Type (4 bits) | |
| To DS (1 bit) | From DS (1 bit) | More Frag (1 bit) | Retry (1 bit) | Power Mgt (1 bit) | More Data (1 bit) | WEP (1 bit) | Order (1 bit) |
| Code considered (8 bits) | | | | | | | |
| Length of the header (8 bits) | | | | | | | |

The values used in this example for the RCH protection according to the invention are 1001 for mode 1, 1010 for mode 2 and 1011 for mode 3.

By way of illustration, three cases can be proposed for conveying the RCH data frames:

"mode 1", the simplest, corresponds to a type that is entirely predefined, for example as a function of the application, for which the RCH parameters are not provided by the frame, since they are assumed to be known to the sender and to the receiver. In this case, the frame check field is unchanged with respect to the standard, and only the scope of the checksum field has to be modified, so as to pertain to the header only (30 bytes in the example considered), "mode 2" allows the introduction of RCH information into the values used to identify a data stream. This information is therefore no longer predefined, and can therefore either vary over time, for example as a function of the state of the link, or simply be redefined by the sender for each new transmission. In this mode, it is therefore proposed to extend the field FC by one byte or two bytes dedicated to the identification of the code considered for the RCH protection and to the information regarding the size of the compressed initial header. In practice, the "mode 3" is like mode 2 in the sense that it too allows the introduction of RCH information, which is in this case limited to the code considered, the information item regarding the length of the compressed header to which the protection has been applied being deduced from the compressed header itself. In practice, this therefore assumes a decoding of the RCH header in two steps:

a first step of decoding the start of the RCH header, allowing the extraction of the information regarding the size of the initial compressed header, and therefore the deduction of the size of the header as a function of the code which has been applied, a second step of decoding the remainder of the RCH header on the basis of the information regarding the size of the header determined previously. A maximum value can be defined for bounding the information regarding the size of the header deduced by decoding, so as to avoid taking erroneous information into account (in the case of a failure of the first decoding step).

CHART 5

| Protocol version (2 bits) | | Type (2 bits) | | Sub-Type (4 bits) | | | |
|---|---|---|---|---|---|---|---|
| To DS (1 bit) | From DS (1 bit) | More Frag (1 bit) | Retry (1 bit) | Power Mgt (1 bit) | More Data (1 bit) | WEP (1 bit) | Order (1 bit) |
| Code considered (8 bits) | | | | | | | |

The proposed extensions are given by way of example, and the mechanism remains the same if one were to choose a different distribution of the extension bits between code considered and header length.

Figure 3:
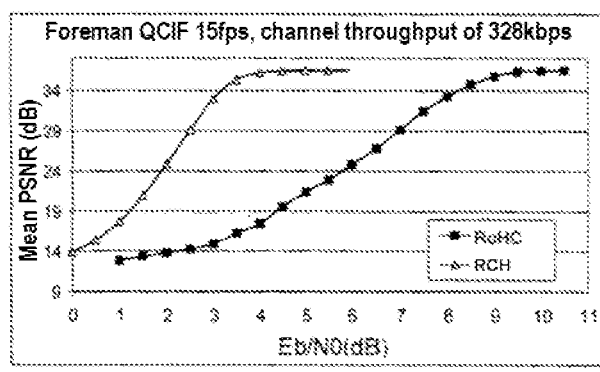
Figure 4:
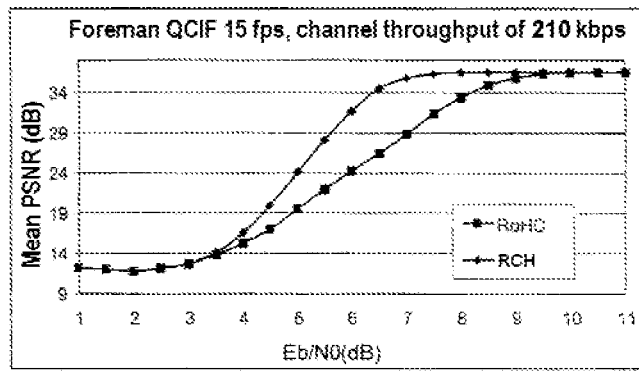

FIGS. 3 and 4 make it possible to illustrate the gain obtained on applying the method according to the invention. The tests were carried out within the framework of an H.264/AVC video transmission, using a version of a coder rendered robust to crashes of the reference JM 10.1 software [3] of the standard. In practice, it is the 'Foreman' reference sequence of the ITU-T, used in the Qcif, 15 Hz format which has been employed, in multi-slice mode that is to say with possible chopping of each image into several slices or sub-images with a maximum size of NAL (Network Abstraction Layer) packets of 192 bytes and groups of 15 images ($I_1P_{14}$). In order to alleviate the high sensitivity to errors of the source coder, these source data have been protected at the application level by applying a convolutional error corrector code (compatible-rate punctured convolutional code (RCPC)) with mother code of rate ⅓ and memory 6 defined in [2]. Two cases are presented, corresponding to a throughput without corrector coding of 164 kbps in ROHC mode and 155 kbps in RCH mode to obtain a throughput transmitted on the identical channel of 328 kbps in the first case (FIG. 3) and 210 kbps in the second case (FIG. 4). Each coded NAL was thereafter encapsulated separately in an RTP frame (Real Time transport Protocol) according to the recommendations of IETF RFC 3984, and then transmitted to a UDP-Lite/IPv6 standard protocol stack before dispatching either to a conventional ROHC compression module, or to the RCH module for compression and then protection according to the invention. In both these cases, the ROHC compression parameters employed were: L=2, FO_TIMEOUT=50, IR_TIMEOUT=1000. The RCH mode was employed in 'mode 1' while employing the abovementioned coder RCPC, used at the mother rate of ⅓. The data were thereafter transmitted on a pseudo radio link, simulated by the addition of Gaussian white additive noise whose signal-to-noise ratio $E_b/N_0$ is the abscissa of the curves presented.

Figure 5:
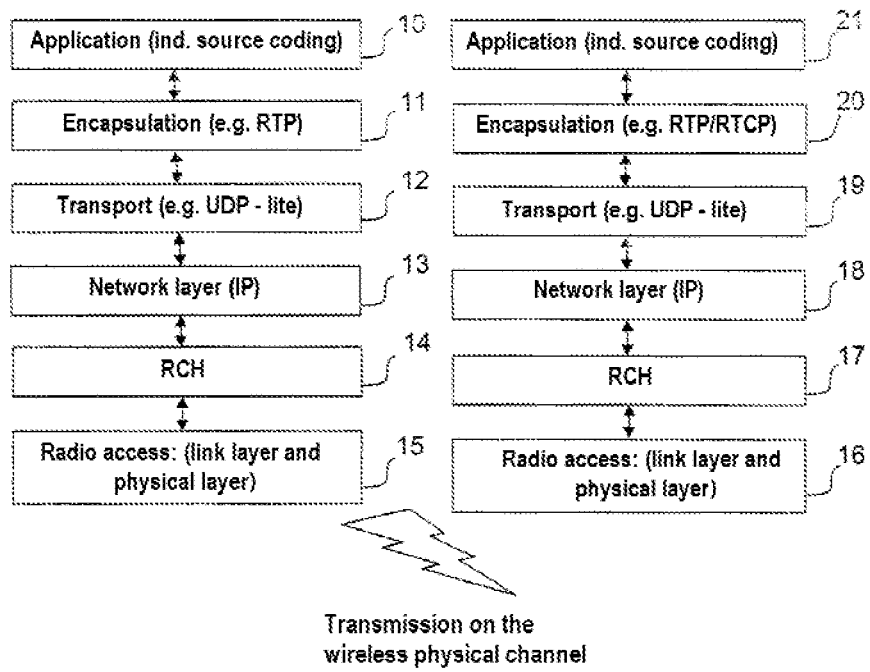
FIG. 5, presents the typical steps of the transmission of multimedia data on a wireless network through the application, session, transport, network, link, and physical layers.

FIG. 5 presents the typical steps of the transmission of multimedia data on a wireless network through the application, session, transport, network, link and physical layers.

In the left part of FIG. 5, an application including the source coding 10, transmits the data to an encapsulation step 11. The encapsulated data are thereafter transmitted by the transport layer 12 to a network layer 13. The network layer transmits the data to an RCH compression step 14, according to the method described in relation to the previous figures. The data with compressed headers are transmitted to the radio access layer 15 comprising the link layer and physical layer. The latter radio access layer will transmit the data having a compressed header to a receiver (right part of the figure). This receiver receives the data at the level of its radio access layer 16, and then transmits them to a header decompression step according to the invention, 17. The decompressed header data are thereafter transmitted to the IP network layer 18, and then to the transport layer 19. The data are thereafter de-encapsulated (step 20) before being transmitted to the application layer 21.

The invention makes it possible notably to improve the transmission of the packets of header type before transmission on a wireless network.

It does not make it necessary to modify the radio access solution adopted except at the level of the header, insertion of the RCH information, modification of the checksum, and this may be authorized in the case of a standard, and that it is less expensive in terms of throughput used than retransmission.

By being inserted into the link header, the solution will be clearly identified, and this may allow a receiver not implementing the invention to detect the frames which employ it and to reject them as not relevant, without uploading erroneous data to the higher layers.

By modifying the scope of the checksum to make it pertain solely to the link header, the loss of the frame for an erroneous payload is avoided, while ensuring that the link header is correct (validated by its checksum), and that the header of the network packet is protected (by the error corrector code and optionally the checksum of the header compression mechanism).

This therefore avoids systematic recourse to ARQ or FEC on the whole of the packet and enhances throughput, and the solution can be applied to mono- and bi-directional links.

REFERENCES

[1] M. Gast, 802.11 wireless networks, the definitive guide. Ed. O'Reilly.
[2] J. Hagenauer, "Rate-compatible punctured convolutional codes and their application," in IEEE Trans. On Communications, vol. 36, n. 4, pp. 389-400, April 1988.
[3] Joint verification model for H.264 (JM 10.1), ttp://ip-home.hhi.de/suchring/tml, July 2006.

The invention claimed is:

1. A method for transmitting data in a transmission system, the data being transmitted in the form of packets comprising at least one compressed header field and one data payload field and according to a format suited to the transmission system comprising the following steps:
  recovering the data packet to be transmitted which comprises a compressed header field and a payload field, identifying the header part from the payload field;
  applying a selected forward error corrector (FEC) coding to the compressed header field of the data packet, and providing to a link layer a resulting new packet comprising the FEC coded compressed header and the uncoded payload, while also communicating a protection mode of the selected FEC coding;
  generating the link layer header according to the transmission format of the transmission system integrating said protection mode, and an adaptation of a CRC checksum of the link layer; and on reception, performing error corrector decoding in two steps, based on the protection mode integrated in the link layer header, said two steps including:
- a first step of decoding a first part of the FEC coded compressed header, making it possible to deduce information regarding a size of the compressed header,
- a second step of decoding a remainder of the FEC coded compressed header on the basis of the previously determined size information.

2. A method for transmitting data in a transmission system, the data being transmitted in the form of packets comprising at least one compressed header field and one data payload field and according to a format suited to the transmission system comprising the following steps:
- recovering the data packet to be transmitted which comprises a compressed header field and a data payload field, identifying the header field from the payload field;
- applying a selected forward error corrector (FEC) coding to the compressed header field of the data packet, and providing to a link layer, a resulting new packet comprising the FEC coded compressed header and the uncoded payload, while also communicating a protection mode of the selected FEC coding;
- introducing parameters of the FEC coding in a frame check field of a link layer header, whose number of bytes is extended by one or more bytes dedicated to said protection mode and to the information regarding the size of the compressed header; and
- generating the link layer header according to a transmission format of the transmission system integrating said protection mode, and an adaptation of an CRC checksum of the link layer.

3. The method of claim 1, wherein the transmission of the data uses the IEEE802.11 standard and the error corrector coding is introduced on the compressed IP header.

4. The method of claim 2 or 3, wherein the parameters of the error corrector coding are assumed to be known to the sender and to the receiver and the parameters are provided by a process which is external to the data frame.

5. The method of claim 4, wherein the data to be transmitted are multimedia data.

6. The method of claim 5, wherein the system is an H.264 video transmission system.

7. A system for transmitting data, the data being transmitted in the form of packets comprising at least one compressed header field and one data payload field, comprising a sender and a decoder receiver wherein said sender comprises means for executing the following steps:
- recovering the data packet to be transmitted which comprises a compressed header field and a payload field, identifying the header part from the payload field;
- applying a selected forward error corrector (FEC) coding to the compressed header field of the data packet, and providing to a link layer a resulting new packet comprising the FEC coded compressed header and the uncoded payload, while also communicating a protection mode of the selected FEC coding;
- generating the link layer header according to the transmission format of the transmission system integrating said protection mode, and an adaptation of a CRC checksum of the link layer; and
- on reception, performing error corrector decoding in two steps, based on the protection mode integrated in the link layer header, said two steps including:
  - a first step of decoding a first part of the FEC coded compressed header, making it possible to deduce information regarding a size of the compressed header,
  - a second step of decoding a remainder of the FEC coded compressed header on the basis of the previously determined size information.

8. A system for transmitting data, the data being transmitted in the form of packets comprising at least one compressed header field and one data payload field, comprising a sender wherein said sender comprises means for executing the following steps:
- recovering the data packet to be transmitted which comprises a compressed header field and a data payload field, identifying the header field from the payload field;
- applying a selected forward error corrector (FEC) coding to the compressed header field of the data packet, and providing to a link layer, a resulting new packet comprising the FEC coded compressed header and the uncoded payload, while also communicating a protection mode of the selected FEC coding;
- introducing parameters of the FEC coding in a frame check field of a link layer header, whose number of bytes is extended by one or more bytes dedicated to said protection mode and to the information regarding the size of the compressed header; and
- generating the link layer header according to a transmission format of the transmission system integrating said protection mode, and an adaptation of an CRC checksum of the link layer.

9. The system of claim 7, wherein the transmission of the data uses the IEEE802.11 standard and the error corrector coding is introduced on the compressed IP header.

10. The system of claim 7 or 8, wherein the parameters of the error corrector coding are assumed to be known to the sender and to the receiver and the parameters are provided by a process which is external to the data frame.

11. The system of claim 10, wherein the data to be transmitted are multimedia data.

12. The system of claim 11, wherein the system is compliant to the H.264 video transmission standard.

* * * * *